United States Patent
Kim et al.

(10) Patent No.: US 11,070,361 B2
(45) Date of Patent: Jul. 20, 2021

(54) BLOCK GENERATION METHOD IN BLOCKCHAIN-BASED SYSTEM

(71) Applicant: SAMSUNG SDS CO., LTD., Seoul (KR)

(72) Inventors: Jeong Ho Kim, Seoul (KR); Min Kang Song, Seoul (KR); Seung Won Son, Seoul (KR); Doo Yeol Kim, Seoul (KR); Seung Jun Ko, Seoul (KR); Yeong Min Seo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 381 days.

(21) Appl. No.: 16/253,525

(22) Filed: Jan. 22, 2019

(65) Prior Publication Data

US 2019/0349185 A1    Nov. 14, 2019

(30) Foreign Application Priority Data

May 9, 2018    (KR) .......................... 10-2018-0053009

(51) Int. Cl.
*H04L 29/06*  (2006.01)
*H04L 9/06*   (2006.01)

(52) U.S. Cl.
CPC .......... *H04L 9/0637* (2013.01); *H04L 9/0643* (2013.01); *H04L 2209/38* (2013.01)

(58) Field of Classification Search
CPC .. H04L 9/0637; H04L 9/0643; H04L 2209/38
See application file for complete search history.

(56) References Cited

U.S. PATENT DOCUMENTS

| | | | | |
|---|---|---|---|---|
| 2019/0028278 A1* | 1/2019 | Gilson | ............... | G06F 12/1408 |
| 2019/0097807 A1* | 3/2019 | Mahanta | ................. | H04L 63/10 |
| 2019/0230089 A1* | 7/2019 | Xu | ........................ | H04W 4/21 |
| 2019/0238327 A1* | 8/2019 | Li | .......................... | G06F 21/64 |
| 2019/0311125 A1* | 10/2019 | Mulgaonkar | ......... | G06F 9/4406 |
| 2019/0327079 A1* | 10/2019 | Nandakumar | ........ | H04L 9/3231 |

FOREIGN PATENT DOCUMENTS

KR    10-2018-0029695 A    3/2018

OTHER PUBLICATIONS

Watanabe, Hiroki, et al. "Blockchain contract: Securing a blockchain applied to smart contracts." 2016 IEEE international conference on consumer electronics (ICCE). IEEE, 2016. (Year: 2016).*

* cited by examiner

*Primary Examiner* — Shawnchoy Rahman
(74) *Attorney, Agent, or Firm* — Sughrue Mion, PLLC

(57) ABSTRACT

Provided is a block generation method in blockchain-based system. The block generation method comprises calculating, by a first blockchain node among the plurality of blockchain nodes, a first node score, propagating, by the first blockchain node, the first node score to the plurality of blockchain nodes, receiving, by the first blockchain node, a delegation of a block generation authority from a second blockchain node among the plurality of blockchain nodes, the second blockchain node having received the first node score and initiating, by the first blockchain node, generation of a new block based on a determination that a block generation node condition, that is based on the block generation authority, has been satisfied.

17 Claims, 13 Drawing Sheets

| NODE | A | B | C | D | E | F | G | H | I | J | K | L |
|------|---|---|---|---|---|---|---|---|---|---|---|---|
| Delegate | C | E | F | C | E | F | F | G | G | H | J | I |

BLOCK GENERATION METHOD IN BLOCKCHAIN-BASED SYSTEM

This application claims the benefit of Korean Patent Application No. 10-2018-0053009, filed on May 9, 2018, in the Korean Intellectual Property Office, the disclosure of which is incorporated herein by reference in its entirety.

BACKGROUND

1. Field

The present disclosure relates to a block generation method in a blockchain-based system, and more particularly, to a block generation method designed to improve efficiency and fairness of a block generation process in a blockchain environment and a blockchain-based system performing the method.

2. Description of the Related Art

A blockchain records continuously increasing data in blocks of a specific unit. It refers to a data management technology that allows each node constituting a peer-to-peer (P2P) network to manage a plurality of blocks in a chain-like data structure or to data itself in the chain-like data structure. Here, the blockchain having the chain-like data structure is operated in the form of a distributed ledger by each node without intervention of a central system.

A blockchain-based system performs a consensus process across the network in order to ensure data integrity and conformity in a distributed environment. The consensus process is performed through processes such as block generation, block propagation and block verification. Conventional blockchain-based systems proposed so far perform the consensus process using a consensus algorithm such as proof of work or proof of stake.

However, the proof of work and the proof of stake are rather inadequate for application to enterprise blockchains due to their disadvantages such as inefficient consumption of computing resources and centralization of block generation.

Specifically, in the proof of work, all blockchain nodes competitively perform mining activities in order to generate a block. Thus, excessive computing resources are consumed on a block generation process. Also, since the mining activities cause excessive power consumption, it is not appropriate to apply the proof of work to enterprise blockchains.

In addition, in the proof of stake, a block generation request may be concentrated on some blockchain nodes having large stakes. Thus, fairness in block generation cannot be ensured. In particular, a blockchain node that generates a plurality of blocks may become a target of attack, acting as a weak point that undermines the reliability and security of the entire system. Therefore, it is also not appropriate to apply the proof of stake to enterprise blockchains.

Moreover, the above consensus algorithms are algorithms designed by targeting public blockchains from the beginning. Therefore, it is difficult to optimize the above consensus algorithms for enterprise blockchains implemented as private blockchains.

In order to solve the above problems, it is required to come up with a novel consensus algorithm optimized for enterprise blockchains, in particular, a block generation method that can ensure efficiency and fairness of a block generation process.

SUMMARY

Aspects of the present disclosure provide a block generation method which can improve efficiency of a block generation process in a blockchain environment and a blockchain-based system performing the method.

Aspects of the present disclosure also provide a block generation method which can ensure fairness in block generation in a blockchain environment and a blockchain-based system performing the method.

Aspects of the present disclosure also provide a block generation method optimized for a blockchain-based system implemented as a private blockchain and a blockchain-based system performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a block generation method performed in a blockchain-based system having a plurality of blockchain nodes. The block generation method comprises calculating, by a first blockchain node among the plurality of blockchain nodes, a first node score, propagating, by the first blockchain node, the first node score to the plurality of blockchain nodes, receiving, by the first blockchain node, a delegation of a block generation authority from a second blockchain node among the plurality of blockchain nodes, the second blockchain node having received the first node score and initiating, by the first blockchain node, generation of a new block based on a determination that a block generation node condition, that is based on the block generation authority, has been satisfied.

According to another aspect of the present disclosure, there is provided a block generation method performed in a blockchain-based system having a plurality of blockchain nodes. The block generation method comprises calculating, by a first blockchain node among the plurality of blockchain nodes, a first node score, receiving, by the first blockchain node, a second node score from a second blockchain node among the plurality of blockchain nodes and delegating, by the first blockchain node, a block generation authority to the second blockchain node based on a result of comparing the first node score and the second node score.

According to still another aspect of the present disclosure, there is provided a blockchain node comprising a hardware processor, a memory and one or more computer programs which are stored in the memory and executed by the hardware processor, wherein the one or more computer programs comprise instructions which, when executed by the hardware processor, cause the hardware processor to perform operations comprising calculating a first node score, propagating the first node score to a plurality of blockchain nodes, receiving a delegation of a block generation authority from another blockchain node among the plurality of blockchain nodes, the other blockchain node having received the first node score and initiating generation of a new block based on a determination that a block generation node condition, based on the block generation authority, has been satisfied.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
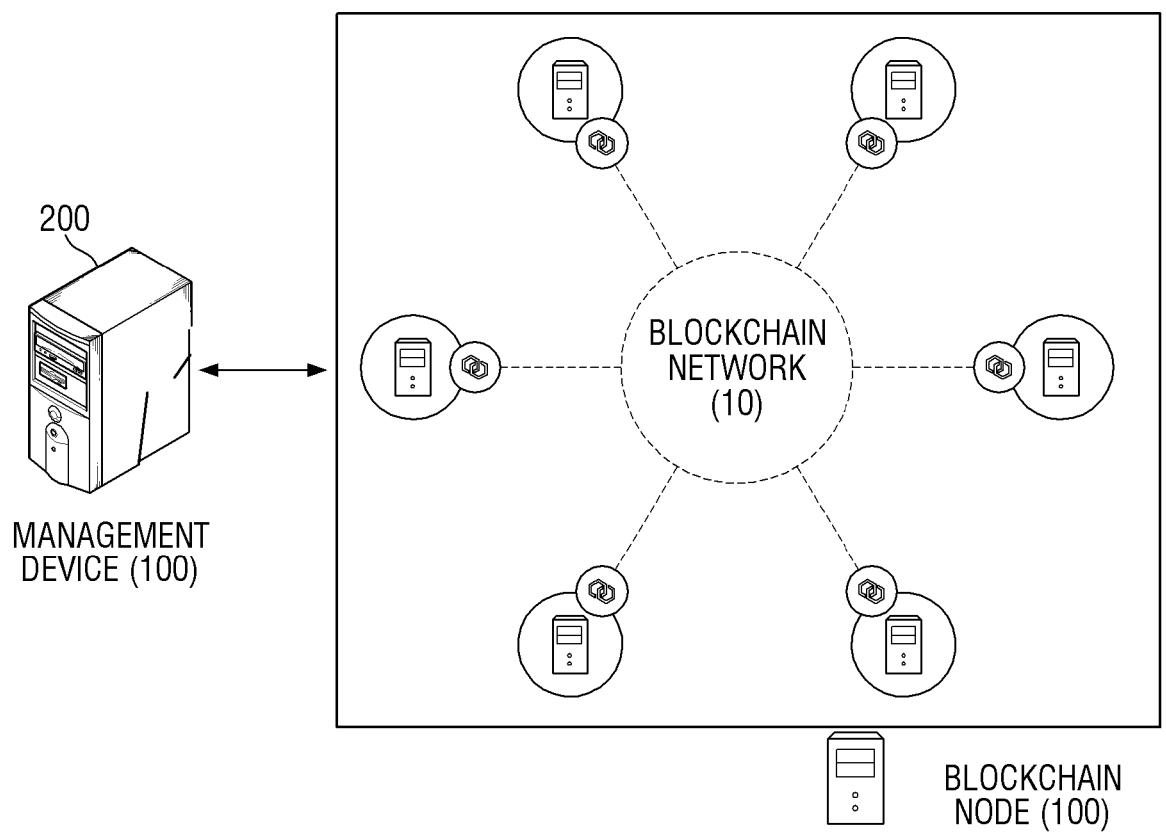
FIG. 1 illustrates the configuration of a blockchain-based system according to an embodiment.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to the description of the present disclosure, some terms used herein will be clarified.

A blockchain network, as used herein, means a peer-to-peer (P2P) network composed of a plurality of blockchain nodes operating according to a blockchain algorithm/protocol.

A blockchain node, as used herein, means a computing node that constitutes a blockchain network and maintains and manages a blockchain based on a blockchain algorithm/protocol. The computing node may be implemented as a physical computing device or a logical computing device such as a virtual machine. When the computing node is implemented as a virtual machine, a plurality of blockchain nodes may be included in one physical computing device.

An example in which the blockchain node is implemented as a physical computing device will be described with reference to FIG. 14.

An instruction, as used herein, is a series of commands bundled together based on function, is a component of a computer program, and is executed by a processor.

Hereinafter, embodiments of the present disclosure will be described in detail with reference to the accompanying drawings.

FIG. 1 illustrates the configuration of a blockchain-based system according to an embodiment.

Referring to FIG. 1, the blockchain-based system may be configured to include a blockchain management device 200 and a plurality of blockchain nodes 100 constituting a blockchain network 10. However, this is merely an embodiment for achieving the objectives of the present disclosure, and some components can be added or removed as needed. In addition, it should be noted that the components of the blockchain-based system illustrated in FIG. 1 are functionally distinct components and that one or more components can be integrated with each other in an actual physical environment. For example, the blockchain management device 200 and at least one blockchain node 100 may be implemented as different logic elements within the same physical computing device.

In the blockchain-based system, each of the blockchain nodes 100 is a computing node operating according to a blockchain algorithm (or protocol). As described above, the computing node can be implemented as a logical computing device such as a virtual machine or implemented as a physical computing device. The physical computing device ay be a notebook computer, a desktop computer, a laptop computer. However, the computing device is not limited to these examples and can be implemented as any type of device having a computing function and a communication function.

The blockchain nodes 100 maintain the same blockchain through a consensus process performed across the blockchain network 10. Therefore, the blockchain-based system can ensure the integrity and security of data to be managed in a distributed environment without intervention of a central server.

According to an embodiment, each of the blockchain nodes 100 calculates and propagates a node score and delegates or is delegated the authority to generate a block based on the comparison result of node scores. In addition, each of the blockchain nodes 100 autonomously determines whether a predetermined block generation node condition (e.g., a condition requiring reception of n or more block generation authorities) has been satisfied and initiates generation of a new block in response to the determination that the block generation node condition has been satisfied. Here, since the node score can vary from one block generation process to another, a blockchain node that generates a new block may also vary from one block generation process to another. Therefore, according to the current embodiment, fairness in block generation can be improved. Furthermore, since not all blockchain nodes need to perform proof of work in order to generate a new block, inefficient consumption of computing resources can also be avoided. The current embodiment will be described in detail later with reference to FIG. 2 and subsequent drawings.

In the above-described embodiment, the block generation node condition literally means a condition for becoming a node generation node. It can be understood that only a blockchain node satisfying the block generation node condition can participate in generation of a new block.

In addition, the node score means a score calculated for each blockchain node in order to determine whether to delegate the authority to generate a block. A method of calculating the node score will be described in detail later with reference to FIG. 7.

In the blockchain-based system, the blockchain management device 200 is a computing device that performs the function of managing the blockchain network 10. Here, the computing device may be a notebook computer, a desktop computer, or a laptop computer. However, the computing device is not limited to these examples and can be implemented as any type of device having a computing function and a communication function.

The blockchain management device 200 may perform authentication, authority management, status check, etc. of the blockchain nodes 100 participating in the blockchain network 10. In addition, the blockchain management device 200 may monitor, for example, branching in a blockchain.

According to an embodiment, the blockchain management device 200 may provide a predetermined block generation node condition to each of the blockchain nodes 100. Here, the block generation node condition may be set based on the authority to generate a block. For example, the block generation node condition may be set to various conditions such as a condition requiring reception of the authority to generate a block from n or more blockchain nodes (where n is a natural number equal to or greater than 1) and a condition requiring reception of the authority to generate a block from k % or more of all blockchain nodes (where k is a real number equal to or greater than 0).

In addition, according to an embodiment, the blockchain management device 200 may change the block generation node condition according to various criteria. In an example, the blockchain management device 100 may manipulate the block generation node condition based on the average block generation time. For example, the blockchain management device 200 may alleviate the block generation node condition according to an increase in the average block generation time. Alternatively, the blockchain management device 200 may manipulate the block generation node condition based on the degree of branching in a blockchain. For example, the blockchain management device 100 may manipulate the block generation node condition to be more stringent if the frequency of branching in the blockchain increases.

For reference, without the help of the blockchain management device 200, each blockchain node 100 can also autonomously change the block generation node condition according to the above criteria, which may be only a difference in implementation method.

In some implementation examples, the blockchain management device 200 or the blockchain nodes 100 may change the block generation node condition according to predetermined configuration information. Here, the configuration information may be composed of conditions based on the above-described criteria (e.g., the average block generation time, the frequency of branching, etc.) and block generation node conditions corresponding to the criterion. For example, the configuration information may include a first block generation node condition in a case where the frequency of branching is equal to or less than a threshold value and a second block generation node condition in a case where the frequency of branching is greater than the threshold value.

In addition, according to an embodiment, different block generation node conditions may be applied to the blockchain nodes 100, respectively. For example, a more relaxed block generation node condition may be applied to a blockchain node with excellent performance or a blockchain node with a low load (e.g., central processing unit (CPU) share) than to other blockchain nodes. According to the current embodiment, since a blockchain node with excellent performance or with a low load is induced to generate a new block, load balancing of the entire system is automatically performed.

The components 100 and 200 of the blockchain-based system illustrated in FIG. 1 may communicate over a network. The network can be implemented as any kind of wired/wireless network such as a local area network (LAN), a wide area network (WAN), a mobile radio communication network, or a wireless broadband Internet (Wibro).

Until now, the blockchain-based system according to the embodiment been described with reference to FIG. 1. A block generation method performed in the blockchain-based system will now be described with reference to FIGS. 2 through 13.

For more ease of understanding, a state transition process of a blockchain node 100, which may occur during a block generation process, will first be described with reference to FIG. 2.

Figure 2:
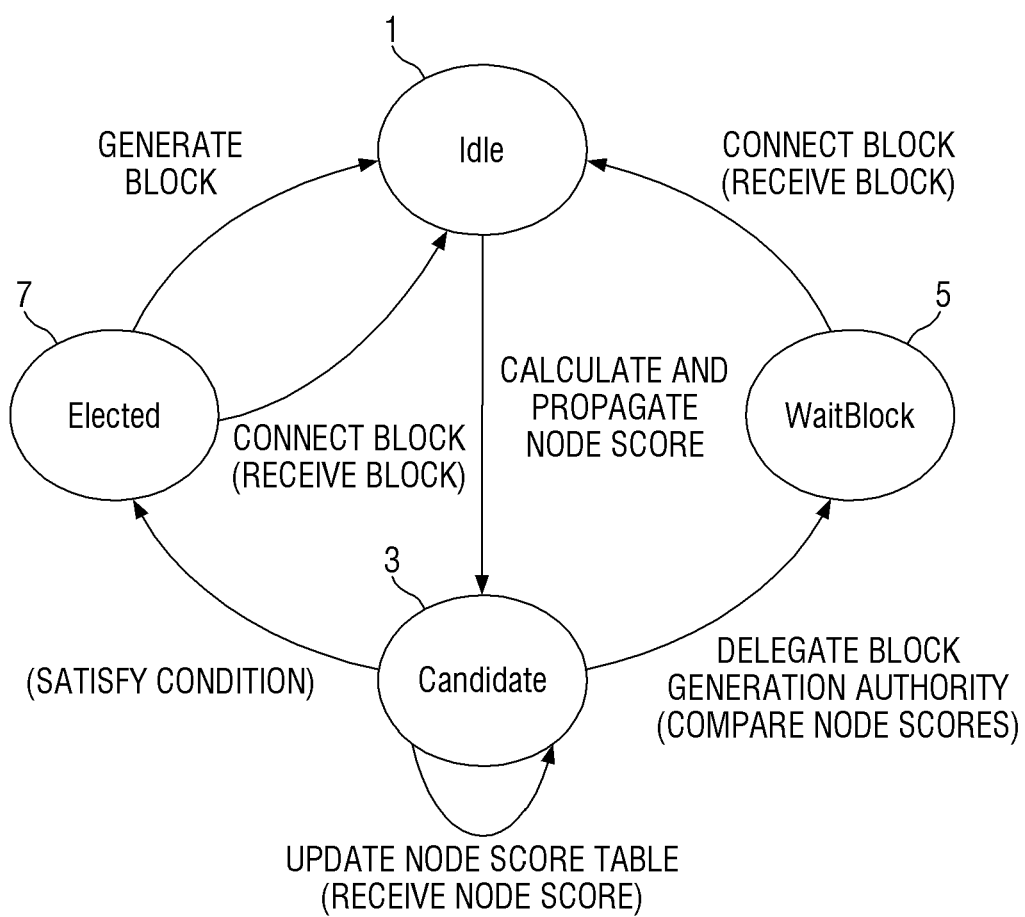
FIG. 2 illustrates the state transition of a blockchain node according to an embodiment.

FIG. 2 illustrates the state transition of a blockchain node 100 according to an embodiment. In FIG. 2, the phrase in brackets indicates an event that causes a state transition, and the phrase not in brackets indicates an action performed during a state transition.

Referring to FIG. 2, the blockchain node 100 may be an idle state 1, a candidate state 3, a waitBlock state 5, and an elected state 7 in each block generation process.

The idle state 1 denotes an initial state in which a block generation process is initiated. The blockchain node 100 may receive a new block generated by another blockchain node or initiate a new block generation process after generating a new block by itself.

The candidate state 3 denotes a state in which the blockchain node 100 exists as a candidate block generation node. The blockchain node 100 may enter the candidate state 3 by calculating its node score and propagating the calculated node score.

While in the candidate state 3, the blockchain node 100 may receive node scores of other blockchain nodes and update a node score table using the received node scores. Here, the node score table refers to a table that stores a node score of each blockchain node. In addition, while in the candidate state 3, the blockchain node 100 may propagate its node score table.

The waitBlock state 5 denotes a state in which the blockchain node 100 gives up generating a new block and waits to receive a new block to be generated by another blockchain node. The blockchain node 100 may enter the waitBlock state 5 by delegating the authority to generate a block to another blockchain node based on the result of comparing its node score with a node score of the blockchain node.

The elected state 7 denotes a state in which the blockchain node 100 is elected as a block generation node. The blockchain node 100 may enter the elected state 7 when satisfying a predetermined block generation node condition. When in the elected state 7, the blockchain node 100 may generate a new block through proof of work or may immediately generate a new block without proof of work. Proof of work is a concept already widely known in the art, and thus its description will be omitted.

Until now, the state transition diagram of the blockchain node 100 has been described with reference to FIG. 2. However, it should be noted than the state transition diagram of FIG. 2 is merely an example used for ease of understanding and that the state transition process of the blockchain node 100 can be designed in various ways.

A block generation method performed by each blockchain node 100 will now be described in detail with reference to FIG. 3. However, the subject of each operation included in the block generation method may be omitted for ease of description. In addition, each operation of the block generation method may be implemented as instructions of a computer program executed by a processor.

FIGS. 3 through 6 are flowcharts illustrating a block generation method according to an embodiment. However, this is merely an embodiment for achieving the objectives of the present disclosure, and some operations can be added or removed as needed.

Figure 3:
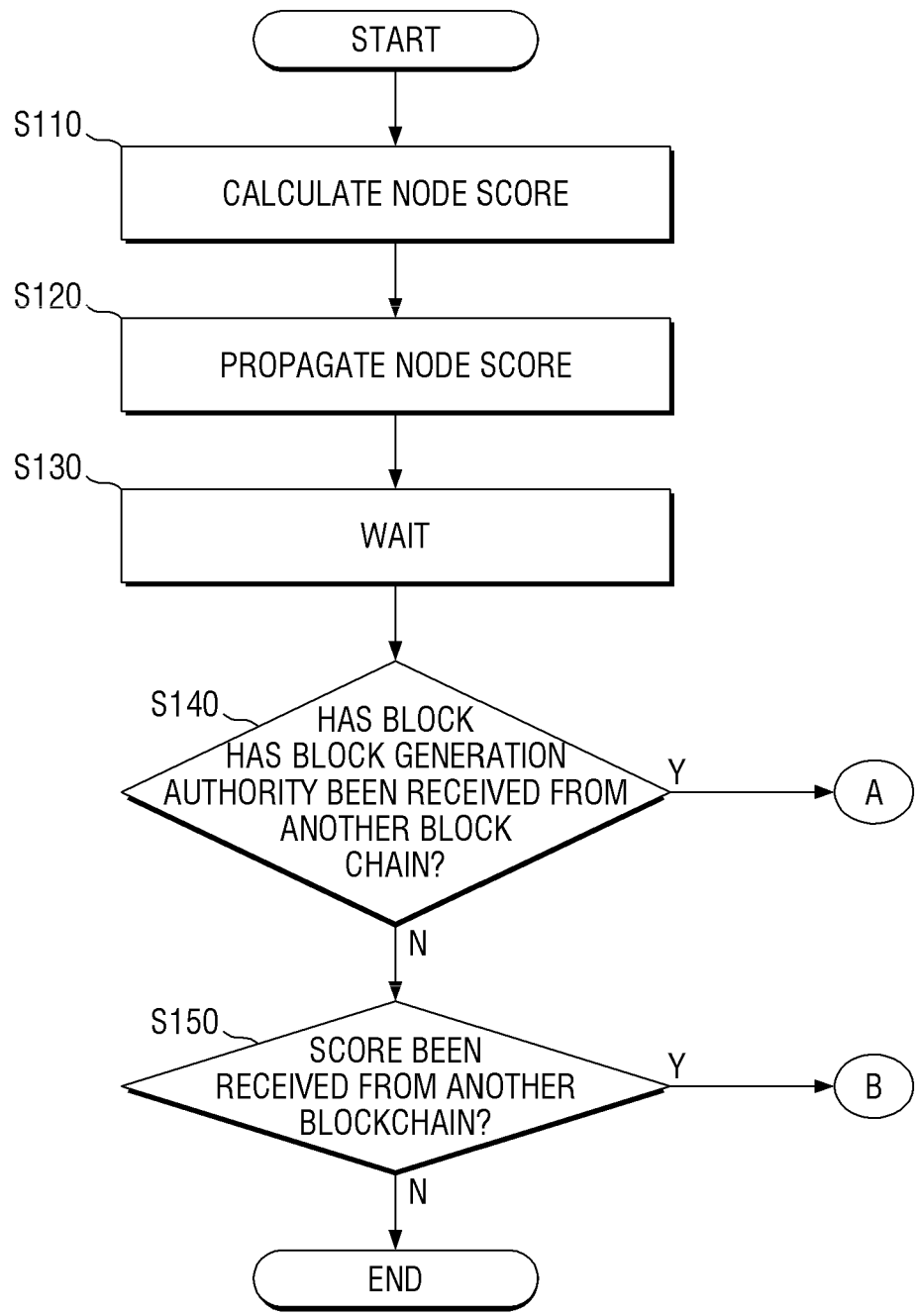
FIGS. 3 through 6 are flowcharts illustrating a block generation method in a blockchain-based system according to an embodiment.

Referring to FIG. 3, the block generation method starts with operation S110 in which a blockchain node 100 calculates a node score. The blockchain node 100 newly calculates a node score in each block generation process in order to ensure fairness in block generation.

In an embodiment, the blockchain node 100 may calculate a node score based on a random value (e.g., a hash value of a block). According to the current embodiment, a blockchain node that generates a new block may be randomly changed for each block generation process. Therefore, it is possible to prevent block generation from being performed only by one specific blockchain node in a blockchain-based system.

Figure 7:
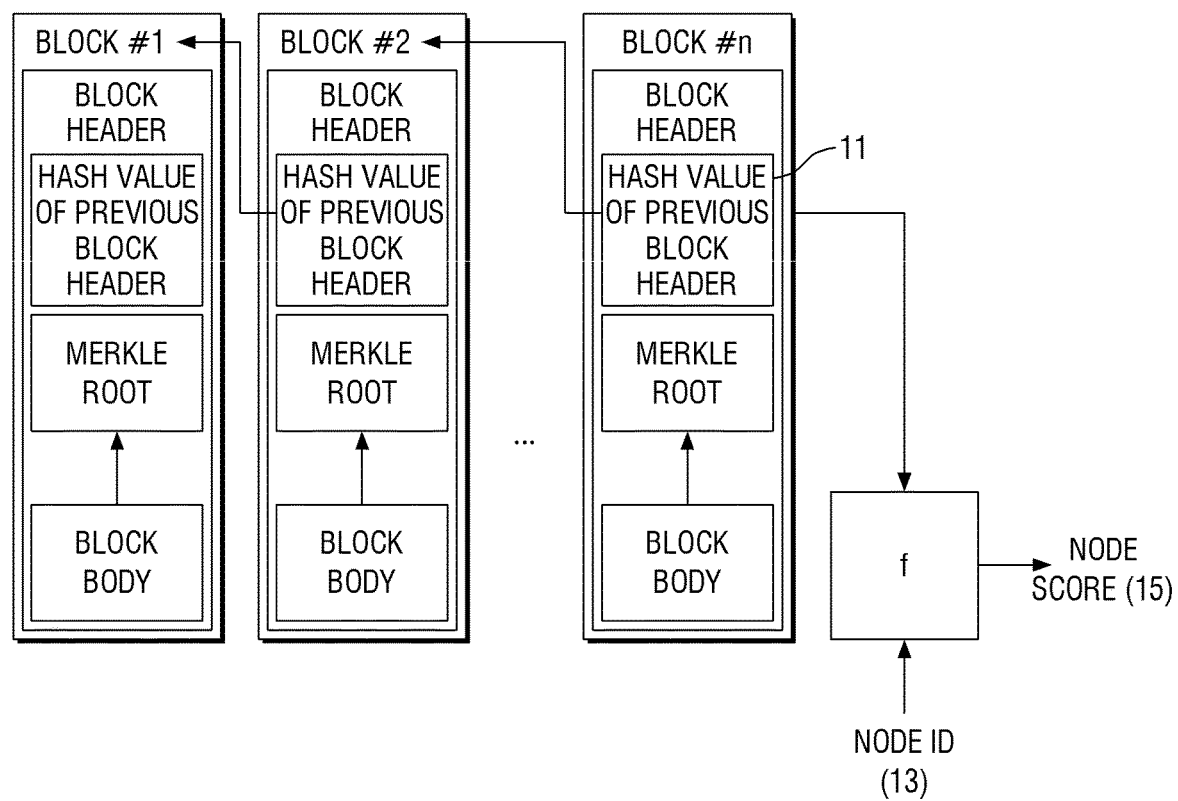
FIG. 7 is a diagram for explaining a method of calculating a node score according to an embodiment.

In an embodiment, referring to FIG. 7, the blockchain node 100 may generate a node score 15 based on its identification value 13 and a hash value 11 of a specific block. For example, the blockchain node 100 may generate the node score 15 by applying a cyclical redundancy check (CRC) technique to the hash value 11 and the identification value 13. For another example, the blockchain node 100 may generate the node score 15 by applying a predetermined hash function to the hash value 11 and the identification value 13. The reason why the node score 15 is generated using the hash value 11 of the specific block is that the hash value 11 is information shared by all blockchain nodes through a blockchain and is verified information recorded in the blockchain. In addition, since the identification value 13 is information that all blockchain nodes are already aware of, the blockchain node 100 that calculated the node score 15 can be verified using the node score 15 as in the following embodiment.

According to an embodiment, the node score 15 may be used to verify a blockchain node. Specifically, when a second blockchain node receives a first node score of a first blockchain node, it may verify the first blockchain node by calculating a node score using an identification value of the first blockchain node and a hash value of a specific block and determining whether the calculated node score is the same as the first node score. That is, through the above process, it is possible to verify that the first node score has been effectively calculated by the first blockchain node participating in a blockchain network. The hash value 11 of the specific block is a value that varies for each block and thus has the nature of a random value. Therefore, according to the current embodiment, it is possible to improve fairness of block generation in the blockchain-based system while improving security of the blockchain-based system.

Referring again to FIG. 3, in operation S120, the blockchain node 100 propagates the calculated node score to a blockchain network 10. For example, the blockchain node 100 may propagate its node score by periodically or non-periodically broadcasting a message containing the node score. In addition, other blockchain nodes receiving the broadcast message may transmit their node scores to the blockchain node 100 in response to the broadcast message.

When broadcasting is used as described above, the order in which the message arrives at each blockchain node may vary depending on network conditions. Accordingly, even if the blockchain node 100 calculates the same node score, a node to which the authority to generate a block is delegated may be changed. Ultimately, the blockchain node that generates a new block may be more randomly changed for each block generation process. Therefore, more fairness among blockchain nodes in block generation can be ensured, and the problem that a particular blockchain node acts as a weak point can be solved. Thus, the security of the blockchain-based system can be improved.

In operation S130, the blockchain node 100 waits to receive the authority to generate a block or to receive a new block. That is, after operation S130, the blockchain node 100 may be delegated the block generation authority by another blockchain node or may receive a node score of another blockchain node, which may be performed in any order.

In operation S140, as the blockchain node 100 is delegated the block generation authority by another blockchain node, a process A may be initiated. Specifically, a specific blockchain node which receives the first node score propagated in operation S120 delegates its block generation authority to the blockchain node 100 in response to the determination that the first node score is higher than a second node score of the specific blockchain node. Here, the specific blockchain node which delegated the block generation authority may give up generating a block and transit from the candidate state 3 to the waitBlock state 5. The process A will be described later with reference to FIG. 4.

In operation S150, as the blockchain node 100 receives a node score from another blockchain node, a process B may be initiated. The process B will be described later with reference to FIG. 5.

Until now, the block generation method according to the embodiment has been described with reference to FIG. 3. The process A performed after the blockchain node 100 is delegated the block generation authority by another blockchain node will now be described.

Figure 4:
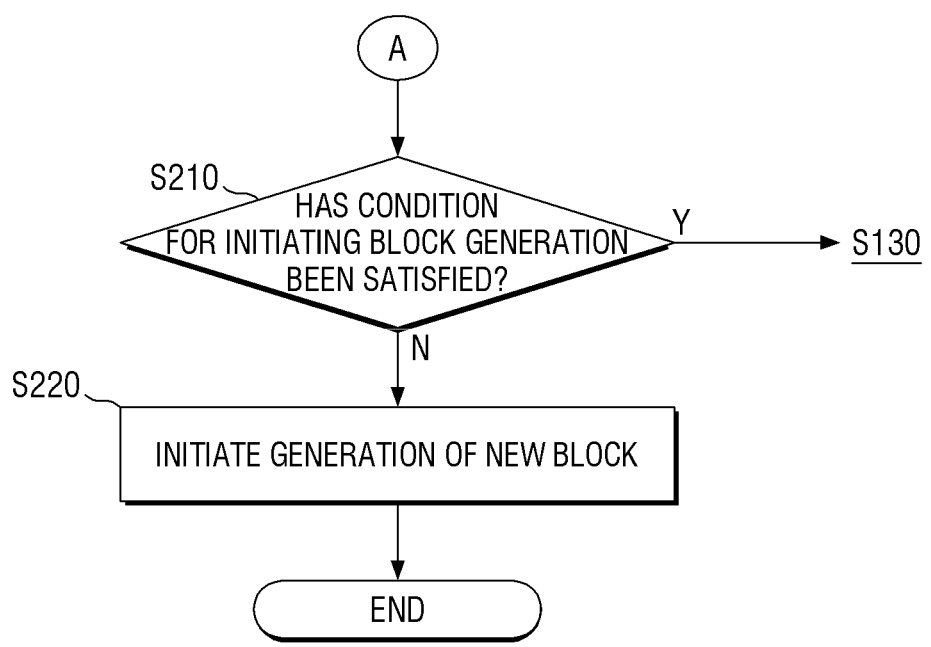

Referring to FIG. 4, in operation S210, the blockchain node 100 determines whether a block generation node condition set based on the block generation authority has been satisfied. For example, if the block generation node condition is a condition requiring reception of n or more block generation authorities, the blockchain node 100 determines whether the number of block generation authorities that it has been delegated so far is n or more.

In operation S220, in response to the determination that the block generation node condition has been satisfied, the blockchain node 100 enters the elected state 7 and initiates generation of a new block.

In an example, the blockchain node 100 may immediately generate a new block in response to the determination that the block generation node condition has been satisfied. According to this example, the time required to generate a block is reduced, thereby improving the performance of the entire blockchain-based system.

In another example, the blockchain node 100 may perform proof of work in response to the determination that the block generation node condition has been satisfied. In addition, the blockchain node 100 may generate a new block only when an appropriate nonce value is derived through proof of work. According to this example, the block generation time may be increased, but proof of work performed additionally can further improve the overall reliability of the blockchain-based system. Moreover, even if there are a plurality of blockchain nodes simultaneously satisfying the block generation node condition, proof of work significantly lowers the possibility that new blocks will be simultaneously generated, which, in turn, lowers the possibility of branching in a blockchain. In the current example, the difficulty of proof of work can be variously set and adjusted according to the target reliability, target block generation time, etc. of the blockchain-based system.

In another example, the blockchain node 100 may generate a new block after waiting a predetermined time in response to the determination that the block generation node has been satisfied. Here, the predetermined time may be randomly determined within a predetermined range. Therefore, even if there are a plurality of blockchain nodes simultaneously satisfying the block generation node condition, the possibility of branching in a blockchain will be lowered because the possibility that new blocks will be generated simultaneously is lowered. Furthermore, the computing cost required for the proof of work can be saved.

Until now, the process A has been described with reference to FIG. 4. The process B performed after the blockchain node 100 receives a node score from another blockchain node will now be described with reference to FIG. 5.

Figure 5:
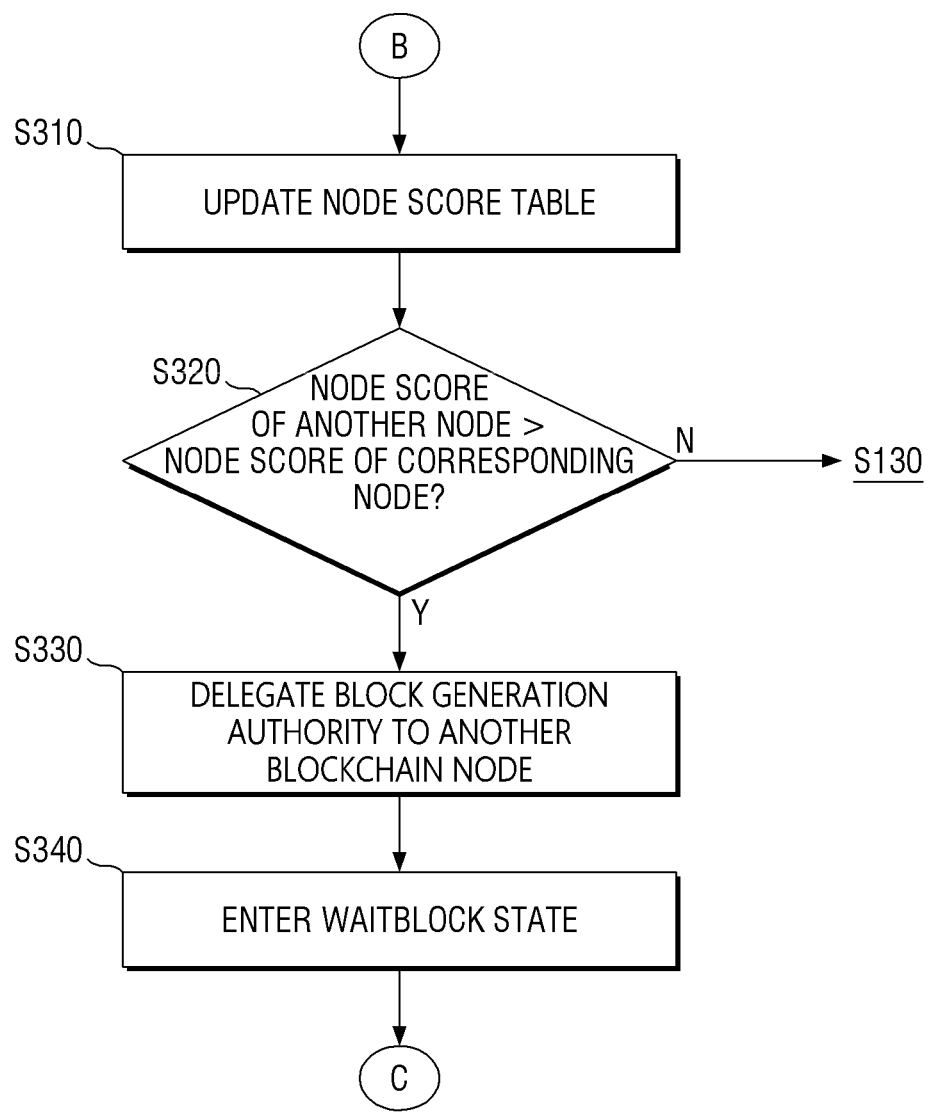

Referring to FIG. 5, in operation S310, a node score table may be updated when a node score calculated by another blockchain node is received. For example, the blockchain node 100 may add a node score of another blockchain node to the node score table. In addition, in operation S310, the blockchain node 100 may send its node score and/or node score table to the another blockchain node.

In operation S320, the blockchain node 100 compares its node score with the node score of the another blockchain node. If the blockchain node 100 determines that its node score is higher than that of the another blockchain node, it performs operation S130 again. On the other hand, if the blockchain node 100 determines that its node score is lower than that of the another blockchain node, it performs operation S330.

In operation S330, the blockchain node 100 delegates its block generation authority to the another blockchain node. For example, the blockchain node 100 may delegate its block generation authority by sending a message indicating delegation of the block generation authority to the another blockchain node.

In operation S340, the blockchain node 100 may give up generating a new block and enters the waitBlock state.

A process C performed in the waitBlock state will now be described with reference to FIG. 6.

Figure 6:
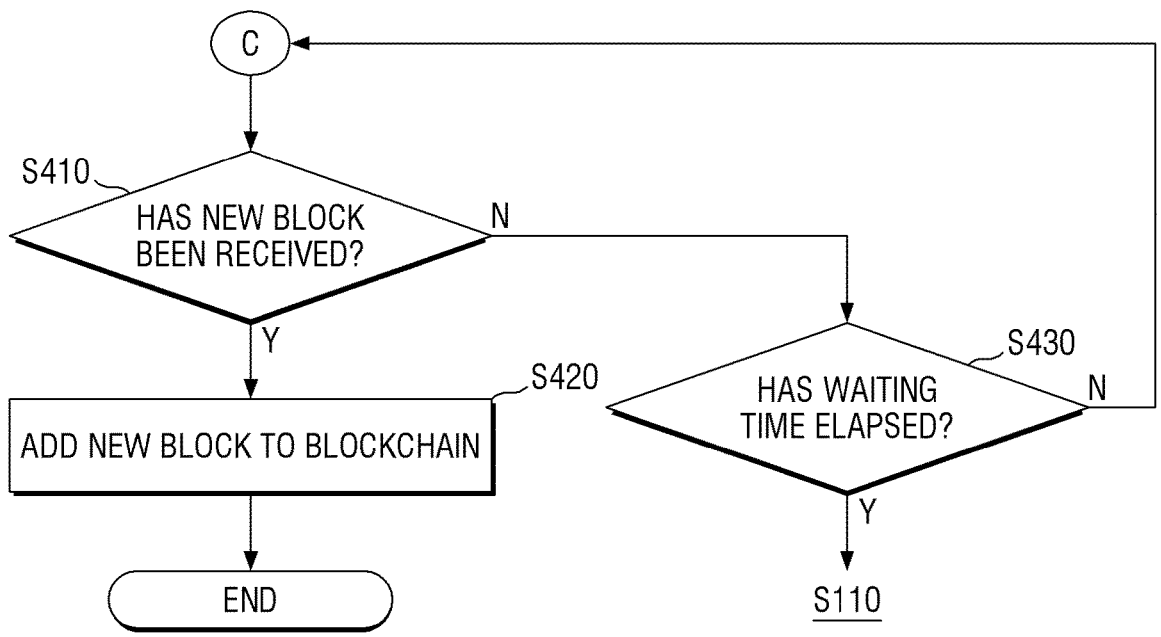

Referring to FIG. 6, in the waitBlock state, the blockchain node 100 adds a new block generated by another blockchain node to the blockchain when receiving the new block in operations S410 and S420.

According to an embodiment, before the adding of the new block in operation S420, the blockchain node 100 may verify the new block and add the new block to the blockchain only when it is verified that the new block is valid.

Here, the verifying of the new block may be performed based on a blockchain node's identification value recorded in the new block. More specifically, a first blockchain node satisfying the block generation node condition records an identification value of a blockchain node, which has delegated the block generation authority to the first blockchain node, in a new block and propagates the new block to a blockchain network. Then, the blockchain node 100 receiving the new block verifies whether the first blockchain node has legitimately generated the new block based on the identification value recorded in the new block. For example, the blockchain node 100 may verify whether the first blockchain node is a node satisfying the block generation node condition based on the number of identification values recorded in the new block. For another example, the blockchain node 100 may verify whether the blockchain node having the identification value recorded in the new block has actually delegated the block generation authority to the first blockchain node. According to the current embodiment, since only a verified new block is added to the blockchain, the reliability and security of the blockchain-based system can be further improved.

On the other hand, if no new block is received and a predetermined waiting time elapses, the blockchain node 100 may restart the block generation process by recalculating a node score in operation S110. That is, if a blockchain node satisfying the block generation node condition is not available for a predetermined time, the blockchain node 100 may autonomously restart the block generation process.

The waiting time may be a preset static value or a variable value that varies according to situation. For example, the waiting time may be a variable value that increases as the number of blockchain nodes participating in the blockchain network increases.

Until now, the block generation method in the blockchain-based system according to the embodiment has been described with reference to FIGS. 3 through 7. According to the above-described method, since not all blockchain nodes need to perform proof of work, unnecessary consumption of computing resources can be avoided. In addition, a blockchain node that generates a new block may be changed for each block generation process due to a randomly generated node score and broadcasting characteristics. Accordingly, fairness among blockchain nodes in block generation can be ensured, and a reduction in the reliability and security of the overall system due to a specific blockchain node dedicated to block generation can be prevented. Furthermore, since the problems of inefficiency of computing resources and unfairness of block generation are all solved, the block generation method can be utilized well in enterprise blockchain-based systems.

For more ease of understanding, a specific example of performing the above-described block generation method will now be described with reference to FIGS. 8 through 13.

Figure 8:
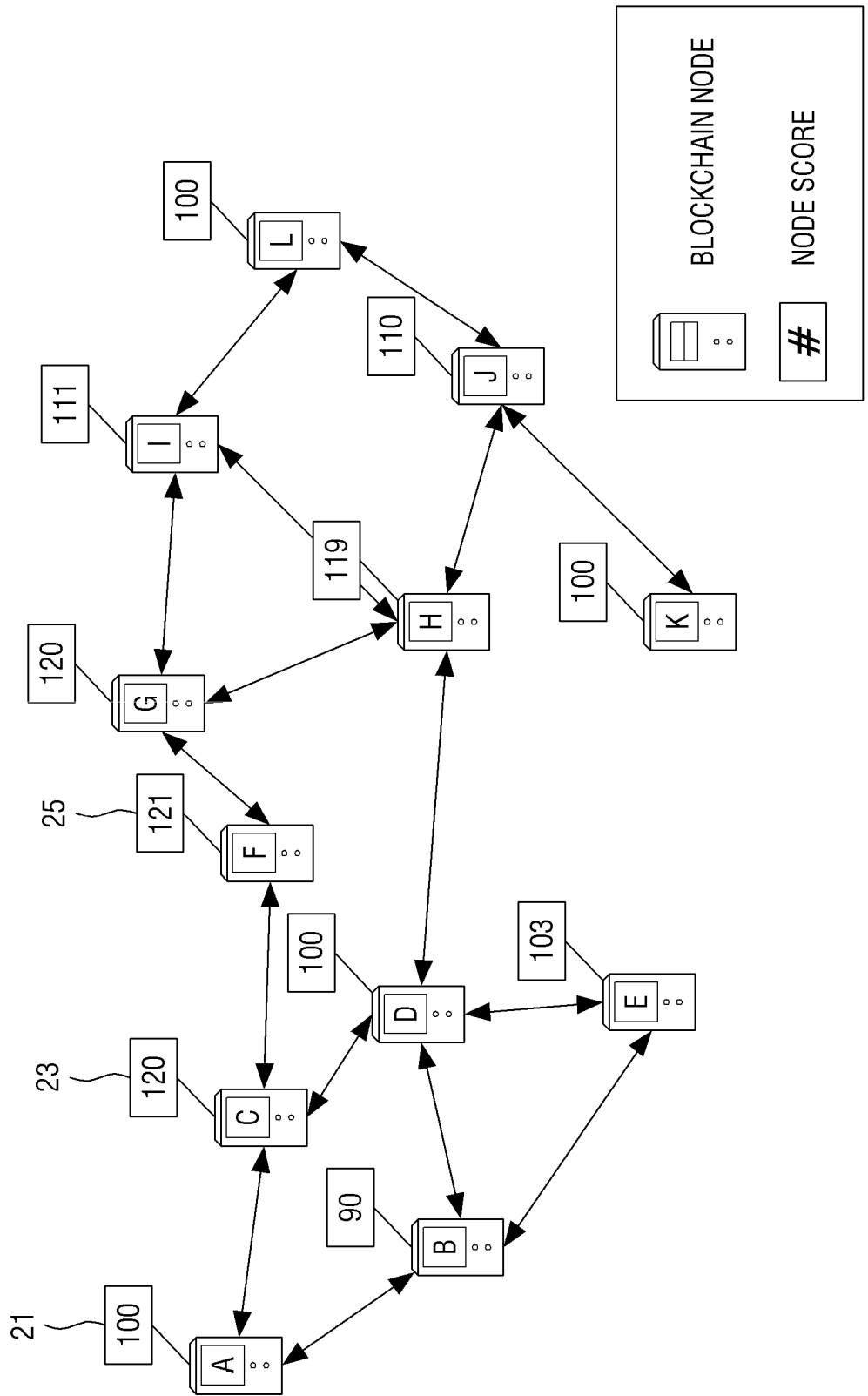
FIGS. 8 through 13 are diagrams for additionally explaining the block generation method in the blockchain-based system according to the embodiment.

First, FIG. 8 illustrates a plurality of blockchain nodes A through L and node scores calculated by the blockchain nodes A through L. Referring to FIG. 8, node scores 21, 23 and 25 of a blockchain node A, a blockchain node C and a blockchain node F are "100", "120" and "121", respectively.

Figure 9:
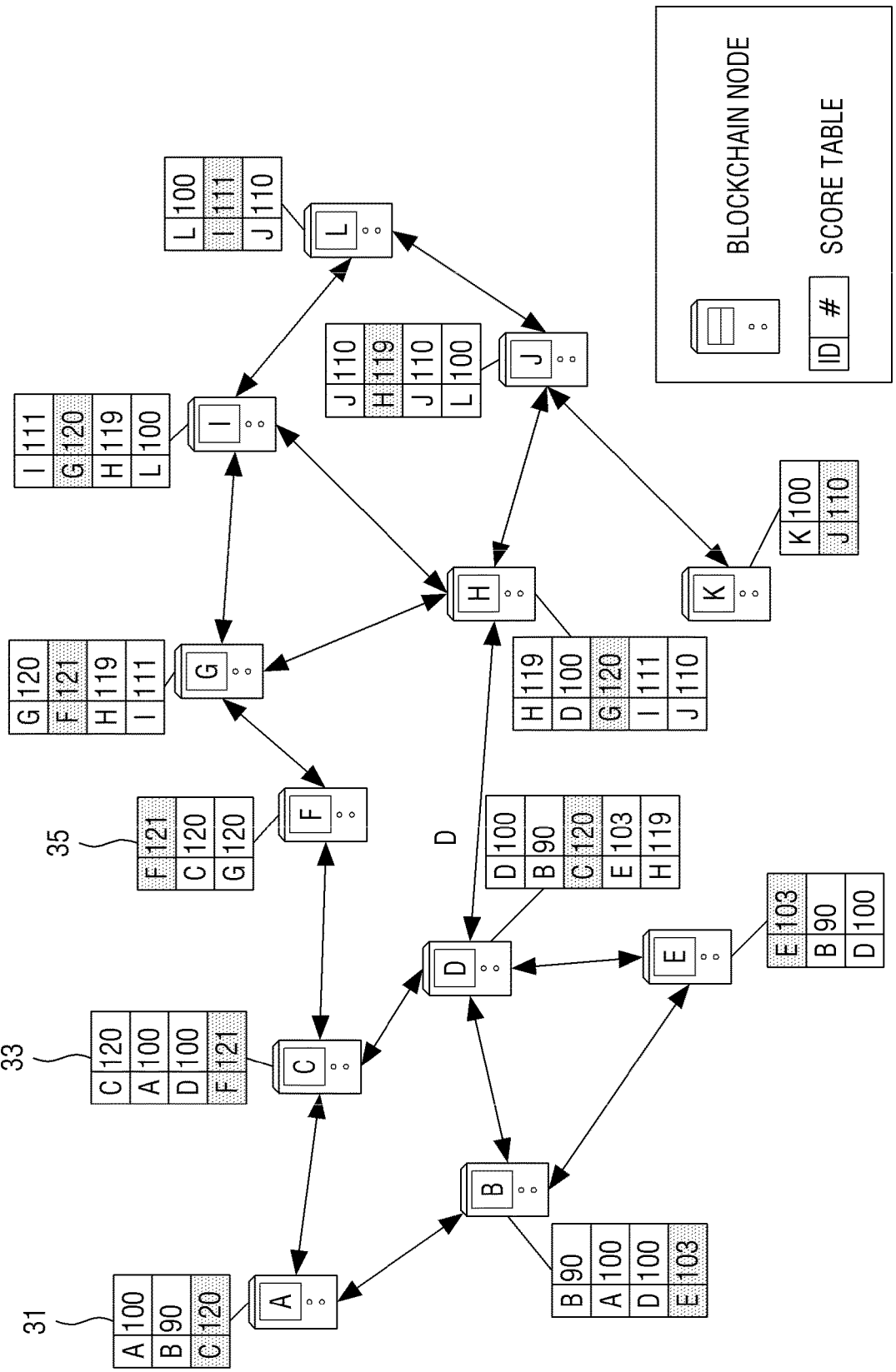

Next, referring to FIG. 9, each of the blockchain nodes A through L exchanges node scores and constructs and updates a node score table. For example, the blockchain node A receives node scores of the blockchain nodes B and C and adds the received node scores to a node score table 31. In the node score tables illustrated in FIG. 9, a shaded entry indicates a highest node score.

Figures 10, 11:
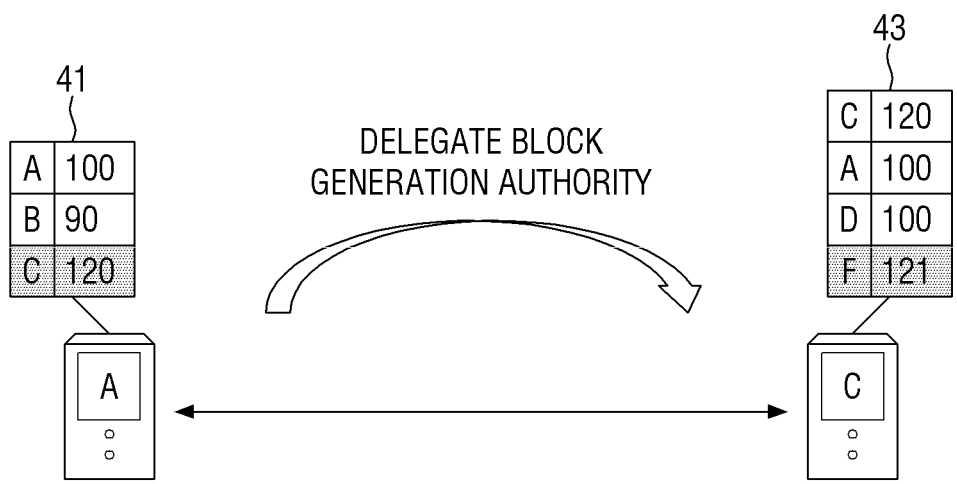
Figure 12:
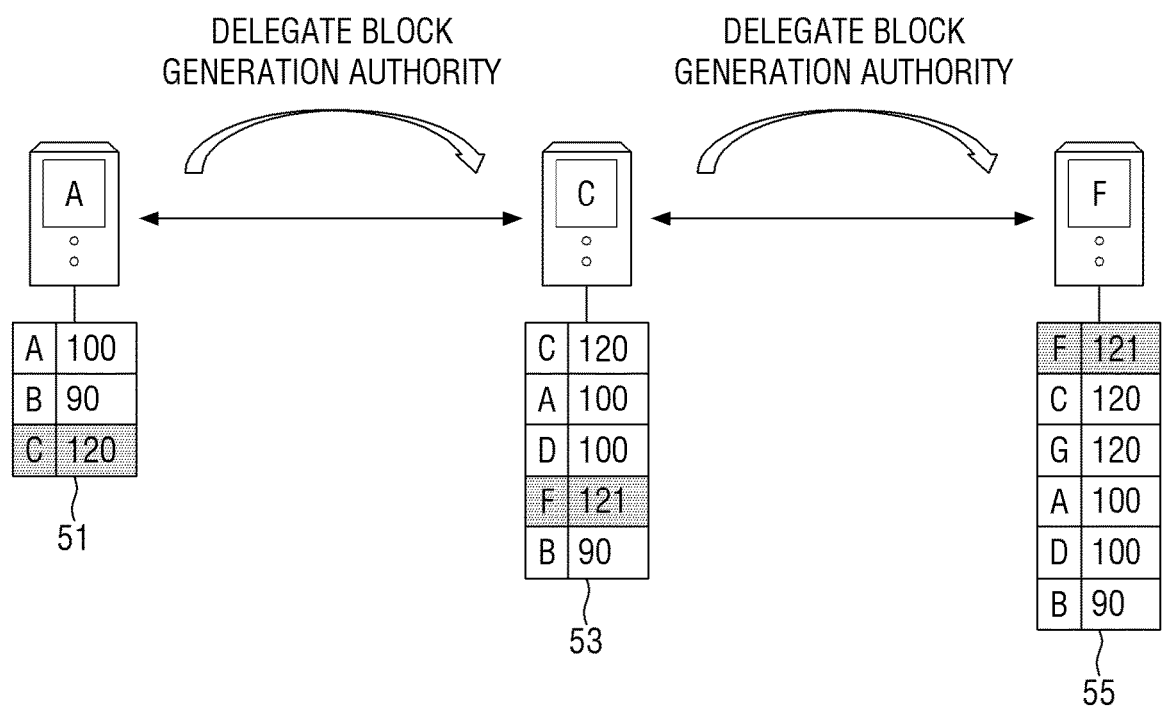

Next, each of the blockchain nodes A through L delegates its block generation authority to another blockchain node or is delegated block generation authority. For example, referring to FIG. 10, the blockchain node A delegates its block generation authority to the blockchain node C having the highest node score. In addition, the blockchain node A which delegated its block generation authority gives up generating a node and enters the waitBlock state. In FIG. 11, the result of delegating the block generation authority among all blockchain nodes A through L is illustrated.

The above process of delegating the block generation authority may be performed successively. For example, referring to FIG. 12, the blockchain node C is delegated the block generation authority of the blockchain node A and delegates its block generation authority and the block generation authority of the blockchain node A to the blockchain node F based on the result of comparing node scores. In this process, the blockchain node C may send a node score table 53 to the blockchain node F, and the blockchain node F may update its node score table 55 based on the node score table 53.

Figure 13:
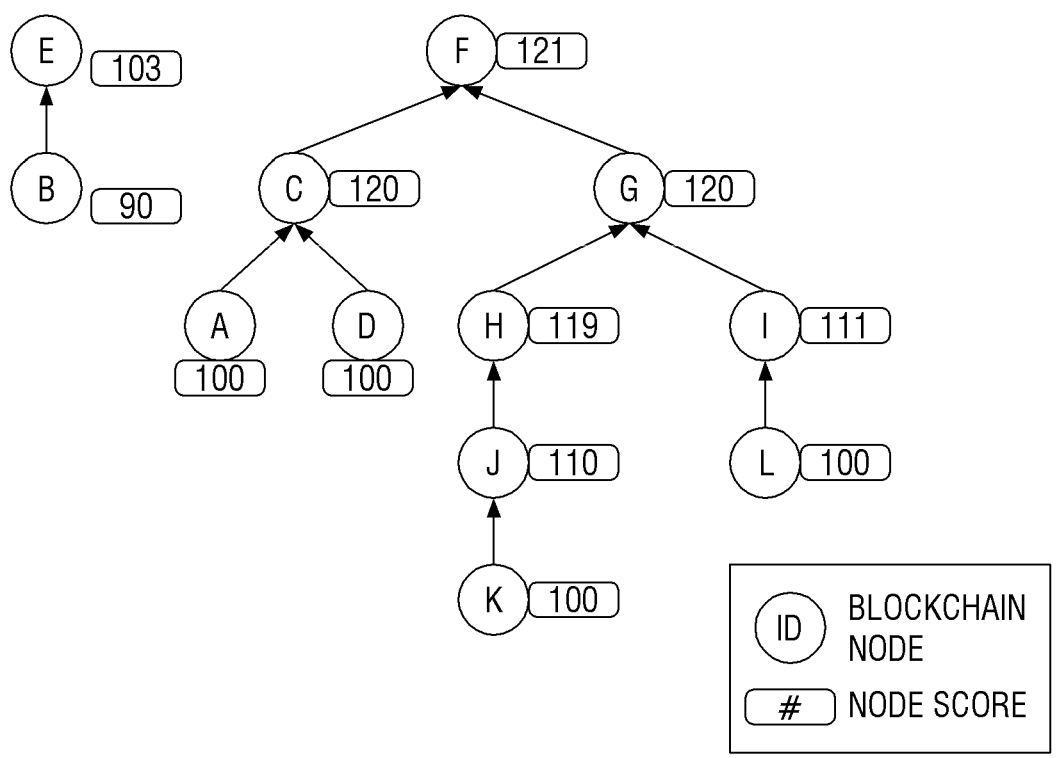

Finally, FIG. 13 illustrates the result of successively delegating the block generation authority. In particular, in FIG. 13, the result of delegating the block generation authority is illustrated in a tree form, and an arrow indicates the delegation direction of the block generation authority.

Referring to FIG. 13, it can be seen that the blockchain node F has been delegated the block generation authority by a total of nine blockchain nodes A, C, D, G, H, I, J, K and L and that the blockchain node E has been delegated the block generation authority by one blockchain node B.

Here, if the block generation node condition is a condition requiring reception of seven block generation authorities, the block chain node F can initiate generation of a new block. For example, the blockchain node F may immediately generate a new node or may generate a new block through proof of work.

Until now, the specific example of performing the block generation method according to the embodiment has been described with reference to FIGS. 8 through 13. The configuration and operation of a blockchain node 100 according to an embodiment will now be described with reference to FIG. 14.

Figure 14:
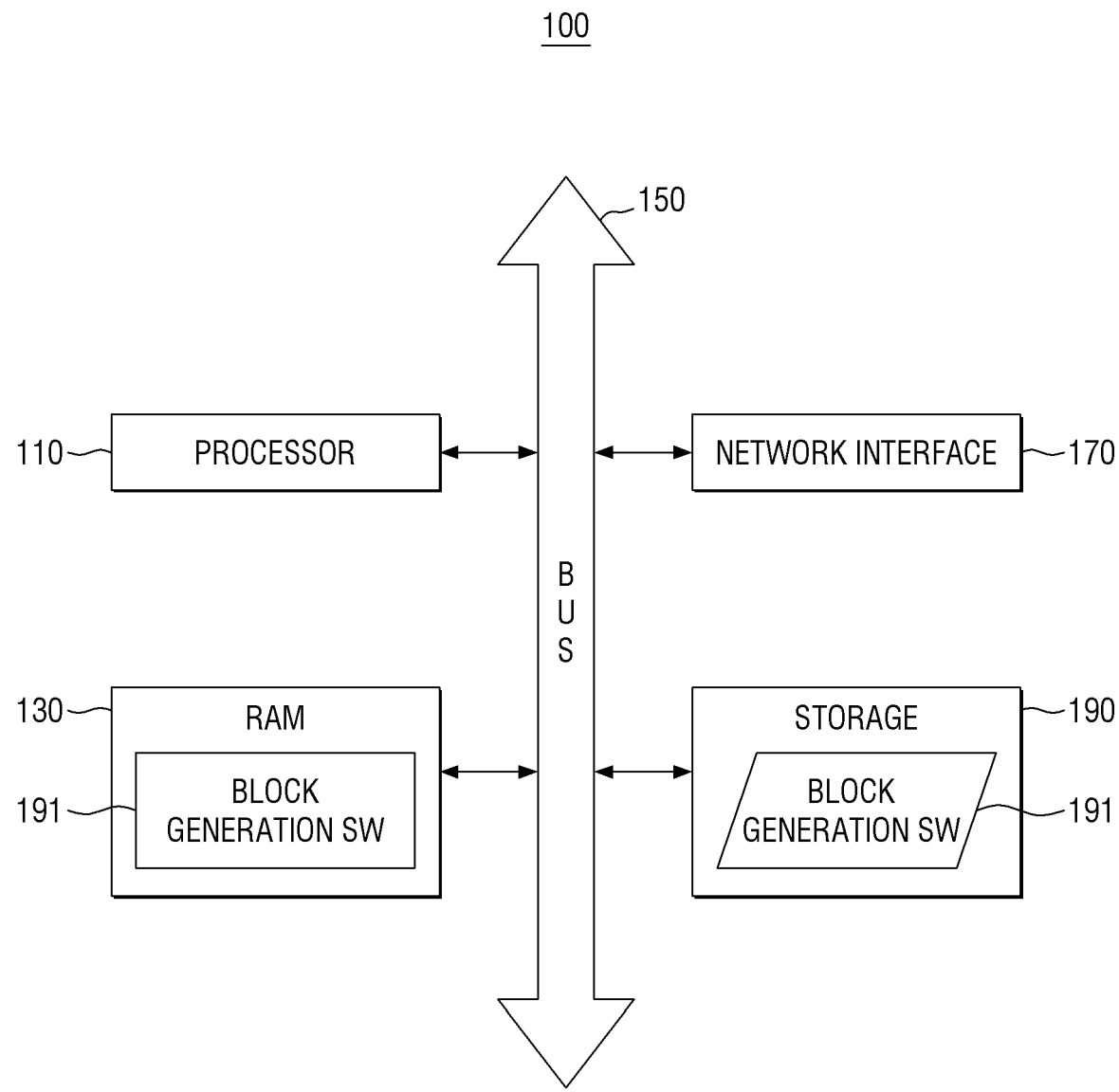
FIG. 14 illustrates the hardware configuration of a blockchain node according to an embodiment.

FIG. 14 illustrates the hardware configuration of a blockchain node 100 according to an embodiment. In particular, in FIG. 14, the blockchain node 100 implemented as a physical computing device is illustrated as an example.

Referring to FIG. 14, the blockchain node 100 may include one or more processors 110, a bus 150, a network interface 170, a memory 130 which loads a computer program to be executed by the processors 110, and a storage 190 which stores block generation software 191 in a blockchain network. FIG. 14, only the components related to the embodiment are illustrated. Therefore, it will be understood by those of ordinary skill in the art to which the present disclosure pertains that other general-purpose components can be included in addition to the components illustrated in FIG. 14.

The processors 110 control the overall operation of each component of the blockchain node 100 in the blockchain network. The processors 110 may include a CPU, a microprocessor unit (MPU), a micro-controller unit (MCU), a graphic processing unit (GPU), or any form of processor well known in the art to which the present disclosure pertains. In addition, the processors 110 may perform an operation on at least one application or program for executing a method according to embodiments. The blockchain node 100 in the blockchain network may include one or more processors.

The memory 130 stores various data, commands and/or information. The memory 130 may load one or more programs 191 from the storage 190 in order to execute a block generation method in a blockchain-based system according to embodiments. In FIG. 14, a random access memory (RAM) is illustrated as an example of the memory 130.

The bus 150 provides a communication function between the components of the blockchain node 100 in the blockchain network. The bus 150 may be implemented as various forms of buses such as an address bus, a data bus and a control bus.

The network interface 170 supports wired and wireless Internet communication of the blockchain node 100 in the blockchain network. In addition, the network interface 170 may support various communication methods other than Internet communication. To this end, the network interface 170 may include a communication module well known in the art to which the present disclosure pertains.

The storage 190 may non-temporarily store the programs 191. In FIG. 14, the block generation software 191 is illustrated as an example of the programs 191.

The storage 190 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The block generation software 191 may include instructions for controlling the processors 110 to perform the block generation method according to the embodiments when the block generation software 191 is loaded into the memory 130.

For example, the block generation software 191 may include instructions for performing an operation of calculating a node score, an operation of propagating the node score to a plurality of blockchain nodes, an operation of being delegated the authority to generate a block by another blockchain node receiving the node score among the blockchain nodes, and an operation of initiating generation of a new block in response to the determination that a block generation node condition based on the block generation authority has been satisfied.

For another example, the block generation software 191 may include instructions for performing an operation of calculating a first node score, an operation of receiving a second node score from another blockchain node, and an operation of delegating the authority to generate a block to the another blockchain node based on the result of comparing the first node score and the second node score.

Until now, the configuration and operation of the blockchain node 100 according to the embodiment have been described with reference to FIG. 14.

Until now, some embodiments and the effects of the embodiments have been mentioned with reference to FIGS. 1 through 14. However, the effects of the embodiments are not restricted to the one set forth herein. The above and other effects of the embodiments will become more apparent to one of daily skill in the art to which the embodiments pertain by referencing the claims.

The concepts of the disclosure described above with reference to FIGS. 1 to 14 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A block generation method performed in a blockchain-based system having a plurality of blockchain nodes, the block generation method comprising:
    calculating, by a first blockchain node among the plurality of blockchain nodes, a first node score;
    propagating, by the first blockchain node, the first node score to the plurality of blockchain nodes;
    receiving, by the first blockchain node, a delegation of a block generation authority from a second blockchain node among the plurality of blockchain nodes, the second blockchain node having received the first node score; and
    initiating, by the first blockchain node, generation of a new block based on a determination that a block generation node condition, that is based on the block generation authority, has been satisfied.

2. The block generation method of claim 1, wherein the delegation of the block generation authority is determined based on a result of comparing the first node score and a second node score calculated by the second blockchain node.

3. The block generation method of claim 1, wherein the first node score is calculated based on a random value.

4. The block generation method of claim 3, wherein the first node score is recalculated in each block generation process.

5. The block generation method of claim 1, wherein the first node score is calculated based on a hash value of a specific block and an identification value of the first blockchain node.

6. The block generation method of claim 5, wherein the first node score is calculated based on a hash value of a previous block and the identification value of the first blockchain node.

7. The block generation method of claim 1, further comprising generating, by the first blockchain node, the new block through proof of work,
    wherein the proof of work is only performed by a blockchain node satisfying the block generation node condition among the plurality of blockchain nodes.

8. The block generation method of claim 1, wherein the block generation node condition is changed based on a degree of occurrence of branching on a blockchain.

9. The block generation method of claim 1, wherein the second blockchain node enters a waitBlock state after delegating the block generation authority.

10. The block generation method of claim 1, comprising recording, by the first blockchain node, an identification value of the second blockchain node in the new block; and
    propagating, by the first blockchain node, the new block to the plurality of blockchain nodes,
    wherein a third blockchain node among the plurality of blockchain nodes that receives the new block verifies the new block based on the identification value recorded in the new block and adds the new block to a blockchain based on verification of the new block.

11. A block generation method performed in a blockchain-based system having a plurality of blockchain nodes, the block generation method comprising:
    calculating, by a first blockchain node among the plurality of blockchain nodes, a first node score;
    receiving, by the first blockchain node, a second node score from a second blockchain node among the plurality of blockchain nodes; and
    delegating, by the first blockchain node, a block generation authority to the second blockchain node based on a result of comparing the first node score and the second node score.

12. The block generation method of claim 11, wherein the second node score is calculated based on a hash value of a specific block included in a blockchain and an identification value of the second blockchain node.

13. The block generation method of claim 12, wherein the delegating the block generation authority comprises:
    verifying the second blockchain node based on the hash value and the identification value; and
    delegating the block generation authority based on verification of the second blockchain node.

14. The block generation method of claim 11, further comprising entering, by the first blockchain node, a waitBlock state based on the block generation authority being delegated to the second blockchain node.

15. The block generation method of claim 14, further comprising terminating, by the first blockchain node, the waitBlock state; and
    recalculating the first node score based on a new block being received.

16. The block generation method of claim 14, further comprising terminating, by the first blockchain node, the waitBlock state; and
    recalculating the first node score based on a determination that a preset waiting time has elapsed.

17. A blockchain node comprising:
    a hardware processor;
    a memory; and
    one or more computer programs which are stored in the memory and executed by the hardware processor,
    wherein the one or more computer programs comprise instructions which cause the hardware processor to perform operations comprising:
    calculating a first node score;
    propagating the first node score to a plurality of blockchain nodes;
    receiving a delegation of a block generation authority from another blockchain node among the plurality of blockchain nodes, the other blockchain node having received the first node score; and
    initiating generation of a new block based on a determination that a block generation node condition, based on the block generation authority, has been satisfied.

* * * * *